United States Patent
Tran Quang Nguyen et al.

(10) Patent No.: US 12,236,530 B2
(45) Date of Patent: Feb. 25, 2025

(54) METHOD FOR FABRICATING THREE-DIMENSIONAL DESCRIPTOR EXTRACTOR, AND METHOD AND SYSTEM FOR RETRIEVING THREE-DIMENSIONAL SHAPE

(71) Applicant: Astraea Software Co., Ltd., Tokyo (JP)

(72) Inventors: Phong Tran Quang Nguyen, Tokyo (JP); Kouji Maruyama, Tokyo (JP); Kiyofumi Shijo, Tokyo (JP)

(73) Assignee: ASTRAEA SOFTWARE CO., LTD., Tokyo (JP)

( * ) Notice: Subject to any disclaimer, the term of this patent is extended or adjusted under 35 U.S.C. 154(b) by 177 days.

(21) Appl. No.: 18/163,053

(22) Filed: Feb. 1, 2023

(65) Prior Publication Data

US 2023/0245392 A1   Aug. 3, 2023

(30) Foreign Application Priority Data

Feb. 2, 2022   (JP) ................. 2022-014874

(51) Int. Cl.
G06T 17/20   (2006.01)
G06T 3/4046   (2024.01)

(52) U.S. Cl.
CPC ............ *G06T 17/20* (2013.01); *G06T 3/4046* (2013.01); *G06T 2207/10028* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2020/0243166 A1   7/2020   Tsumura et al.
2020/0372626 A1   11/2020   Dal Mutto et al.
(Continued)

FOREIGN PATENT DOCUMENTS

| JP | 2014-102746 A | 6/2014 |
|----|----|----|
| JP | 2019-008337 A | 1/2019 |
| WO | 2019/078006 A1 | 4/2019 |

OTHER PUBLICATIONS

Yi-Ling Qiao, et al.; LaplacianNet: Learning on 3D Meshes with Laplacian Encoding and Pooling; IEEE Transactions on Visualization and Computer Graphics; Aug. 5, 2020; 10 pages; www.researchgate.net/publication/336936837.

(Continued)

*Primary Examiner* — Nurun Flora
(74) *Attorney, Agent, or Firm* — LUCAS & MERCANTI, LLP

(57) ABSTRACT

A three-dimensional shape descriptor extractor is implemented by collecting surface data from a three-dimensional shape as learning data and training a set of a prescribed encoder and a prescribed decoder by using the learning data, wherein the training extracts a three-dimensional shape descriptor from the learning data by using the encoder, undoes the three-dimensional shape descriptor by using the decoder, evaluates a difference between a state before using the encoding and a state after using the decoding, and adjusts the encoder and the decoder so as to reduce the difference, and mesh data is collected from the three-dimensional shape as the surface data and made to have a prescribed scale, so as to train the encoder and the decoder.

3 Claims, 15 Drawing Sheets

(56) References Cited

U.S. PATENT DOCUMENTS

2021/0287430 A1* 9/2021 Li ....................... G06V 10/776
2021/0397966 A1* 12/2021 Sun ...................... G06V 10/82

OTHER PUBLICATIONS

N. Sharp, et al; A Laplacian for Nonmanifold Triangle Meshes; Eurographics Symposium on Geometry Processing 2020, vol. 39, No. 5; Aug. 12, 2020; 12 pages; onlinelibrary.wiley.com/doi/am-pdf/10.1111/cgf.14069.
T. Groueix, et al; A Papier-Mache Approach to Learning 3D Surface Generation; Computer Vision and Pattern Recognition; Jun. 18-22, 2018; 9 pages; openaccess.thecvf.com/CVPR2018_search.
K. Gupta, et al; Neural Mesh Flow: 3D Manifold Mesh Generation via Diffeomorphic Flows, 34th Conference on Neural Information Processing Systems (NeurIPS 2020); Dec. 6-12, 2020; 12 pages; proceedings.neurips.cc/paper/2020.
C. Qi, et al; PointNet: Deep Learning on Point Sets for 3D Classification and Segmentation; Computer Vision and Pattern Recognition; Jul. 21-26, 2017; 9 pages; openaccess.thecvf.com/CVPR2017_search.
Decision to Grant for Japanese Patent Application No. 2022-014874 dated Nov. 25, 2022, with English translation.

* cited by examiner

POINT CLOUD MODEL

MESH MODEL

| IMAGES OF ADJACENT MESHES | POINT CLOUD SAMPLE COUNT |
|---|---|
| SURFACE SIDE  | LOW |
| SURFACE SIDE  | MODERATE |
| SURFACE SIDE  | HIGH |

METHOD FOR FABRICATING THREE-DIMENSIONAL DESCRIPTOR EXTRACTOR, AND METHOD AND SYSTEM FOR RETRIEVING THREE-DIMENSIONAL SHAPE

CROSS-REFERENCE TO RELATED APPLICATION

This application is based upon and claims the benefit of priority of the prior Japanese Patent Application No. 2022-014874, filed on Feb. 2, 2022, the entire contents of which are incorporated herein by reference.

FIELD

The present invention relates to a method for fabricating a three-dimensional shape descriptor extractor, a three-dimensional shape retrieval method, and a three-dimensional shape retrieval system.

BACKGROUND

In recent years, artificial intelligence (AI) using various two-dimensional data, e.g., two-dimensional shape recognition based on a deep neural network (DNN) vital to artificial intelligence (AI), has been developed and put into practical use.

Meanwhile, techniques for recognizing three-dimensional shapes are, under present circumstances, difficult to put into practical use in comparison with techniques for recognizing two-dimensional shapes.

The reason is that the relationships between the components of a three-dimensional shape are difficult to represent in a fixed format, unlike pixel arrays representing a two-dimensional shape. Thus, it is difficult to compress data to a level at which the data can be processed by a computer, with the features of a three-dimensional shape maintained, so AI for dealing with three-dimensional shape data has not been put into practical use.

Amid the above situation, a presentable apparatus for recognizing a subject having a three-dimensional shape is a subject recognition apparatus for selecting, from a plurality of database images to undergo image search, a database image of a subject candidate by using a subject development image generated on the basis of three-dimensional shape data and texture data of the subject, and outputting the selected subject development image, the subject recognition apparatus including: a query feature representation means for extracting a feature site from the subject development image and calculating a first local descriptor for the feature site of the subject development image; a database feature representation means for extracting a feature site from the database images to undergo image search and calculating a second local descriptor for the feature site of the database images; and a collation means for determining a projective transformation matrix from pairs of nearest neighbor feature points generated on the basis of a result of comparing the first and second local descriptors, calculating a similarity score after narrowing down the pairs of nearest neighbor feature points by using the projective transformation matrix, and specifying a database image similar to the subject development image on the basis of the score (patent document 1).

Meanwhile, a physical body identification system for identifying a physical body within a certain region is presentable, the physical body identification system including: an imaging unit that images the certain region; a ranging unit that measures the distance from the imaging unit to the certain region; a model generation unit that generates a mesh model of the certain region on the basis of the distance measured by the ranging unit; an object extraction unit that extracts, from the mesh model of the certain region generated by the model generation unit, a mesh model of an object projecting from a mesh model of the background of the certain region; and an object specifying unit that collates the mesh model of the object extracted by the object extraction unit with information on physical bodies stored in a database, so as to specify the object (patent document 2).

However, the technique of patent document 1 involves developing a subject in the form of a two-dimensional image, and the technique of patent document 2 involves the need to estimate unimaged portions for complementation, so such techniques are unsuitable to accurately identify a three-dimensional shape on the basis of three-dimensional shape data.

A list of works cited is below.
Patent Document 1: Japanese Patent Application Publication No. 2014-102746
Patent Document 2: Japanese Patent Application Publication No. 2019-8337 (Summary of the Invention)

SUMMARY

A method for fabricating a three-dimensional shape descriptor extractor according to the first aspect of the invention includes collecting surface data from a three-dimensional shape as learning data; and training a set of a prescribed encoder and a prescribed decoder by using the learning data as the three-dimensional shape descriptor extractor, the training extracting a three-dimensional shape descriptor from the learning data by using the encoder, undoes the three-dimensional shape descriptor by using the decoder, evaluates a difference between a state before using the encoding and a state after using the decoding, and adjusts the encoder and the decoder so as to reduce the difference, wherein the collecting collects mesh data from the three-dimensional shape as the surface data and making the mesh data have a prescribed scale, and the training trains the encoder and the decoder using the surface data.

A method for fabricating a three-dimensional shape descriptor extractor according to the second aspect of the invention includes collecting surface data from a three-dimensional shape as learning data; and training a set of a prescribed encoder and a prescribed decoder by using the learning data, the training extracting a three-dimensional shape descriptor from the learning data by using the encoder, undoes the three-dimensional shape descriptor by using the decoder, evaluates a difference between a state before using the encoding and a state after using the decoding, and adjusts the encoder and the decoder so as to reduce the error, wherein the collecting collects, as the surface data, more point cloud data for adjacent mesh faces forming an acuter surface angle for meshes capable of being encoded and decoded by the three-dimensional shape descriptor extractor, the training trains the encoder and the decoder using the surface data.

A three-dimensional shape retrieval method with a first three-dimensional shape descriptor extractor fabricated using the method of the first aspect and a second three-dimensional shape descriptor extractor fabricated using the method of the second aspect according to the third aspect of the invention includes predicting, among existing three-dimensional shape data, a class of a shape type that draft data corresponds to; and retrieving, from three-dimensional shape data belonging to a predicted class, three-dimensional shape data having a three-dimensional shape similar to the three-dimensional shape of the draft data, wherein the predicting the class that the draft data corresponds to is performed by an AI model on the basis of a first three-dimensional shape descriptor extracted from the draft data by the first three-dimensional shape descriptor extractor, the AI model is a learning-finished model that has learned and generated, as a learning data pair, a second three-dimensional shape descriptor extracted from the existing three-dimensional shape data by the first three-dimensional shape descriptor extractor and a class name of a class to which three-dimensional shape data pertaining to the second three-dimensional shape descriptor belongs, and that has learned, in advance, a relationship between the second three-dimensional shape descriptor and the class name, the retrieving extracts, by using the second three-dimensional shape descriptor extractor, a third three-dimensional shape descriptor for the draft data and a fourth three-dimensional shape descriptor for the three-dimensional shape data belonging to the class, compares the third three-dimensional shape descriptor with the fourth three-dimensional shape descriptor, and determines that three-dimensional shape data pertaining to the fourth three-dimensional shape descriptor having a shortest distance to the third three-dimensional shape descriptor is similar to the draft data.

A three-dimensional shape retrieval system with a first three-dimensional shape descriptor extractor fabricated using the method of the first aspect and a second three-dimensional shape descriptor extractor fabricated using the method of the second aspect 2 according to the fourth aspect of the invention includes an acquisition unit configured to acquire draft data that pertains to a three-dimensional shape descriptor; a storage unit configured to store existing three-dimensional shape data; an extraction unit configured to extract three-dimensional shape descriptors by using the first three-dimensional shape descriptor extractor and the second three-dimensional shape descriptor extractor; a prediction unit configured to predict, among the existing three-dimensional shape data, a class of a shape type that the draft data acquired by the acquisition unit corresponds to; and an retrieval unit configured to retrieve, among desired three-dimensional shape data, three-dimensional shape data similar to the three-dimensional shape of the draft data, and an output unit configured to output retrieved three-dimensional shape data, wherein the prediction unit performs a prediction by an AI model on the basis of a first three-dimensional shape descriptor extracted from the draft data by the first three-dimensional shape descriptor extractor, the AI model is a learning-finished model that has learned and generated, as a learning data pair, a second three-dimensional shape descriptor extracted from the existing three-dimensional shape data by the first three-dimensional shape descriptor extractor and a class name of a class to which three-dimensional shape data pertaining to the second three-dimensional shape descriptor belongs, and that has learned, in advance, a relationship between the second three-dimensional shape descriptor and the class name, and the retrieval unit extracts, by using the second three-dimensional shape descriptor extractor, a third three-dimensional shape descriptor for the draft data and a fourth three-dimensional shape descriptor for the three-dimensional shape data belonging to the class, compares the third three-dimensional shape descriptor with the fourth three-dimensional shape descriptor, and determines that three-dimensional shape data pertaining to the fourth three-dimensional shape descriptor having a shortest distance to the third three-dimensional shape descriptor is similar to the draft data.

DESCRIPTION OF EMBODIMENTS

Terminologies

Figure 1:
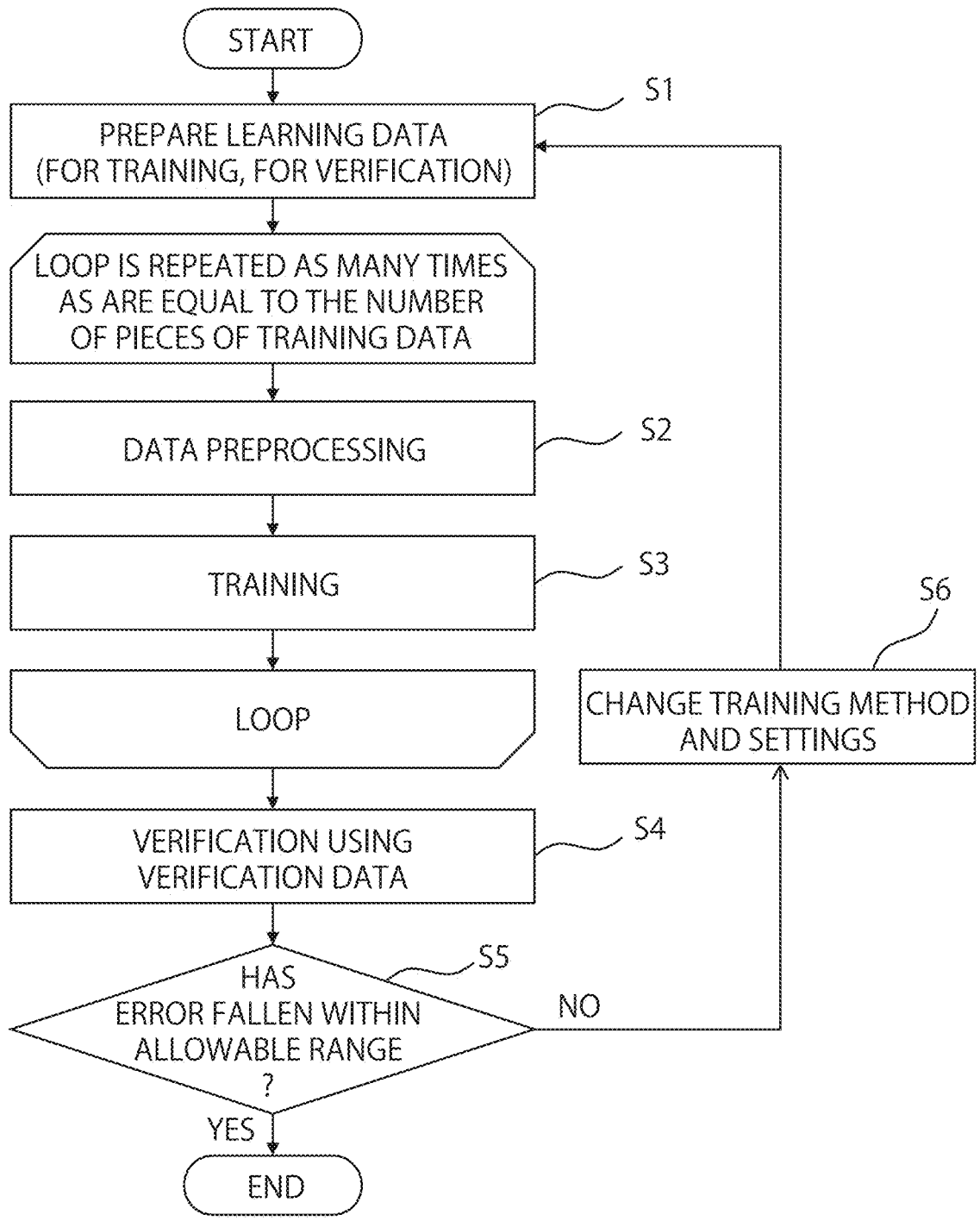
FIG. 1 illustrates a flow of fabrication of a three-dimensional shape descriptor extractor.

The following describes terminologies in the present invention.

In the present invention, a three-dimensional shape descriptor is numerical data representing features of three-dimensional shape obtained with three-dimensional coordinate/surface data as original data. In technical fields pertaining to the present invention, a three-dimensional shape descriptor is referred to as a feature vector or a feature amount vector. In the present invention, a three-dimensional shape descriptor including no size information of a three-dimensional shape includes only features of the shape, and a three-dimensional shape descriptor including size information includes dimension information in addition to features of the shape.

In the present invention, an encoder is a program for converting three-dimensional coordinate/surface data so as to extract (encode) a three-dimensional shape descriptor. A three-dimensional shape descriptor is extracted by a so-called deep neural network (DNN). A decoder is a program for performing an operation the reverse of the encoder so as to undo (decode) a three-dimensional shape descriptor.

In the present invention, mesh data can be collected from a surface of a three-dimensional shape and processed and includes triangular mesh data, quadrangular mesh data, and mesh data having other polygonal shapes. Point cloud data can be collected from a surface of a three-dimensional shape and processed and is formed from a plurality of arbitrary points.

In the present invention, a three-dimensional shape descriptor extractor is implemented by training and verifying a set of a prescribed encoder and a prescribed decoder. The training is a repetitive task of encoding and decoding training data constituted by surface data of a three-dimensional shape and making setting adjustment of the encoder and the decoder until the error between a state before the encoding and a state after decoding is reduced. The verifying is a task of checking an error of a trained three-dimensional shape descriptor extractor, with surface data of a three-dimensional shape as verification data.

In the present invention, a surface angle between adjacent mesh faces is an angle formed by the two mesh faces. A surface angle being acute means a distant state in comparison with an adjacent state on a flat face.

In the present invention, a class is a shape type classified according to features of existing three-dimensional shape data and tagged by an owner or an administrator. The administrator sets class names and tags individual pieces of three-dimensional shape data with the class names.

In the present invention, an AI model for class prediction is a learning-finished model generated by so-called supervised learning. Learning algorithms are not limited.

Various Types of Processing in Present Invention

Processing in the present invention is performed by an apparatus or program provided with functions required for the processing in the present invention. For example, the apparatus may be a terminal for communicating and inputting or outputting data, a CPU (control apparatus, arithmetic computing apparatus), or a storage apparatus (main storage apparatus, auxiliary storage apparatus). In a presentable example of program execution, a prescribed program stored in an auxiliary storage apparatus or a program for performing another type of processing is read to a main storage apparatus and executed by a CPU. Such processing may also be performed via a network.

A problem to be solved by an embodiment of the present invention is to easily and accurately identify a three-dimensional shape.

First Embodiment

With reference to a first embodiment, the following describes fabrication of a three-dimensional shape descriptor extractor from mesh data and fabrication of a three-dimensional shape descriptor from point cloud data.

FIG. 1 is a flow diagram of fabrication of a three-dimensional shape descriptor extractor including no size information. In terms of a roughly represented flow, first, learning data for verification is prepared (step S1). The learning data is divided into learning data for training and learning data for verification. The data for training is used to train an encoder and a decoder, and the data for verification is used to verify the trained encoder and the trained decoder.

Next, preprocessing of the learning data is performed for the training of the encoder and the decoder (step S2) (details are described hereinafter).

Subsequently, the encoder and the decoder are trained (step S3). The encoder and the decoder are programs stored in a prescribed library so as to be released and available. The programs are improved and tuned through the training (details are described hereinafter). The training is repeatedly performed a designated number of times.

Next, a result of encoding and decoding using verification data is verified (step S4). The processing ends when the error falls within a prescribed range. When the error does not fall within the prescribed range, the settings of the encoder and the decoder are changed (step S6), and the task is returned to the start of the loop and repeated until the error falls within the prescribed range.

The following describes details of fabrication of a three-dimensional shape descriptor extractor from mesh data.

First, three-dimensional shape data is prepared as learning data (step S1). Any form of data can be the three-dimensional shape data, as long as the same includes the coordinates of the vertexes of meshes for representing the surface, and data for connections (edges) between the coordinates. For example, data pertaining to a three-dimensional shape is acquired from a 3DCAD or 3D scanner or the like. However, the method for acquiring data is not limited.

Figure 2:
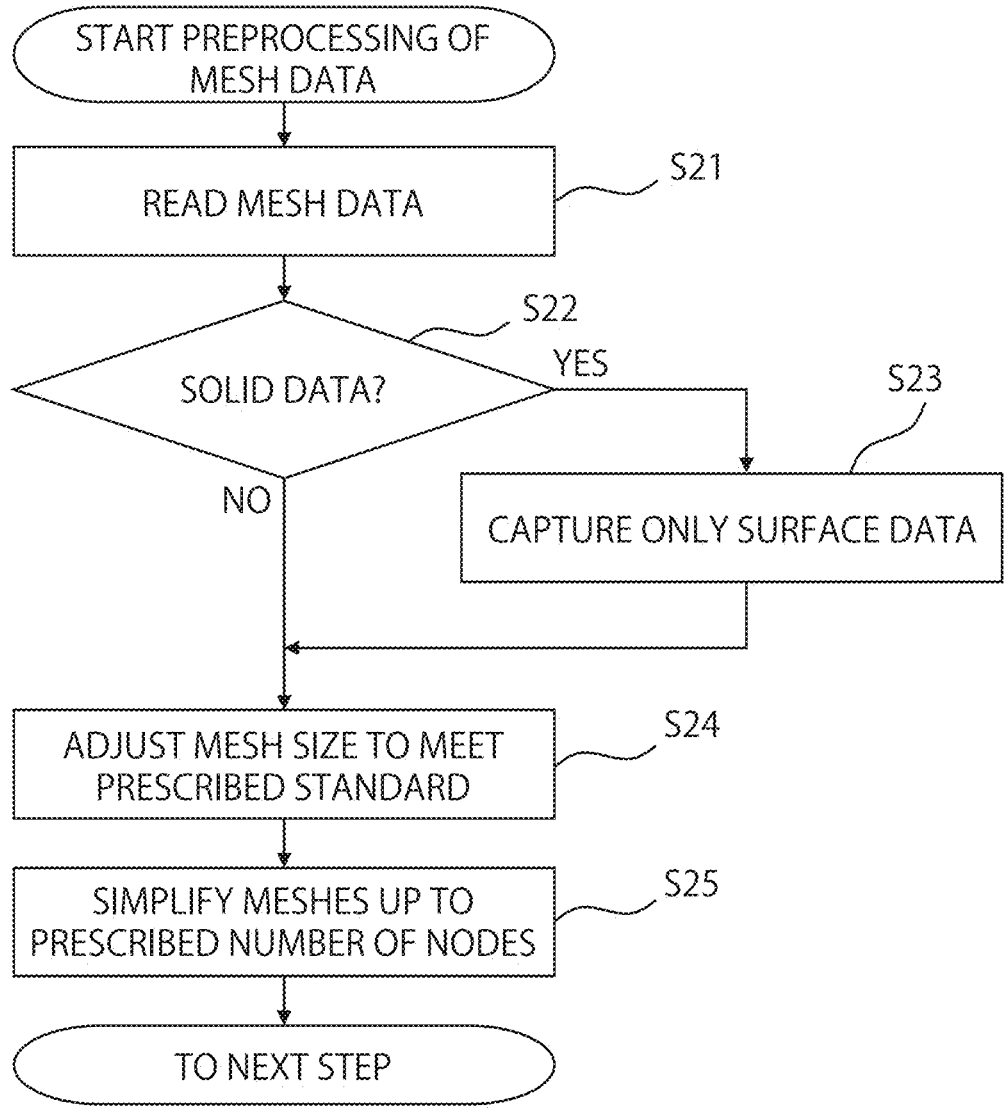
FIG. 2 illustrates a flow of preprocessing of mesh data.

Next, preprocessing of the data for the training of the encoder and the decoder is performed (step S2). FIG. 2 illustrates a flow of preprocessing of mesh data, indicating details of the preprocessing. First, acquired mesh data is read for preprocessing (step S21).

Next, it is determined whether the read mesh data is solid data (S22). The present invention only requires surface data, so when information on the inside of a three-dimensional shape is included, only surface data is captured (step S23).

Next, the size of the three-dimensional shape is adjusted to meet a prescribed standard (step 24) so as to allow the meshes to form a surface shape of the three-dimensional shape, and when there is room for simplification, the simplification is proceeded with up to a prescribed number of nodes (step S25). The size adjustment, which is intended for ease of treatment in terms of processing, uniformizes mesh data scales within a prescribed size range. As a result of the processing, a three-dimensional shape descriptor extracted from the mesh data does not include size information (based only on features of the three-dimensional shape). The simplification decreases the number of nodes (reduce the resolution) to the extent that a feature amount is not lost, without the time required to train the encoder and the decoder going out of an allowable range.

Figure 3:
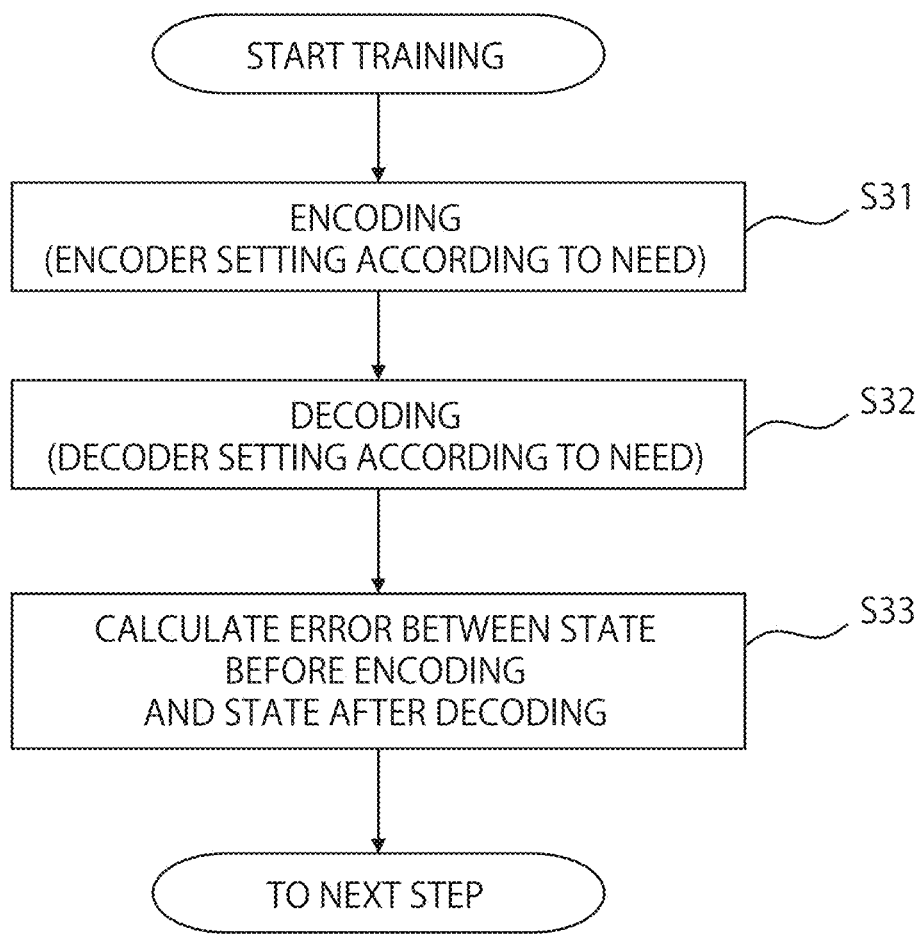
FIG. 3 illustrates a flow of training an encoder and a decoder with mesh data.

Subsequently, the encoder and the decoder are trained with the mesh data after the preprocessing (step S3). FIG. 3 illustrates a flow of training an encoder and a decoder with mesh data. The training includes: a step for encoding preprocessed mesh data as input data and extracting a three-dimensional shape descriptor as output data (S31); a step for decoding the extracted three-dimensional shape descriptor (S32); a step for calculating the error between the mesh data after the decoding and the mesh data before the encoding (S33); and optionally, a step for adjusting the encoder and the decoder in order to enhance the reproducibility of the mesh data (S31-S33).

The encoder and the decoder can be obtained by combining, improving or tuning those obtained from a publicly released library. In the present invention, any encoder and decoder can be used as long as the same can encode and decode mesh data. However, the encoder and the decoder need to satisfy the following requirements.

A first requirement is that rough meshes and irregular-shaped meshes be capable of being encoded and decoded. This is because meshes will have a reduced resolution and be made rough through preprocessing in order to enhance the performance of encoding and decoding.

A second requirement is that encoding and decoding be capable of being performed even when meshes forming a surface of a three-dimensional shape are small-sized and densely located. This is because meshes forming a surface of a complicated or minute three-dimensional shape are small-sized and densely located.

A third requirement is that meshes after decoding have a closed mesh shape and not intersect each other. This is because the three-dimensional shape cannot be represented if the meshes after decoding include intersecting portions or open portions.

A fourth requirement is that encoding and decoding be capable of being performed without losing the features of the three-dimensional shape. Not only the surfaces of the three-dimensional shape but also the relationships between the surfaces need to be maintained to maintain the entire shape.

A fifth requirement is that encoding and decoding be capable of being performed without being affected by the relationship between nodes or edges of a three-dimensional shape or by the size of the three-dimensional shape. Training with mesh data is intended to fabricate a three-dimensional shape descriptor extractor that includes no size information of a three-dimensional shape and obtains the features of the shape alone. Thus, the influence of the size should be avoided.

A sixth requirement is that three-dimensional shape descriptors obtained through encoding for the same three-dimensional shape exhibit no variation therebetween. This is because adherence to results of encoding and decoding needs to be attained.

A seventh requirement is that three-dimensional shape descriptors obtained by decoding the same three-dimensional shape descriptor exhibit no variation therebetween. This is based on a similar reason to the sixth requirement.

An eighth requirement is that results of encoding or decoding exhibit no variation therebetween for a three-dimensional shape isotropically converted (parallel translation, uniform scaling, rotation). This is based on similar reasons to the sixth and seventh requirements.

In view of the above requirements, the present embodiment used, for selection of an encoder, LaplacianNet, which allows for representation with a result of encoding connections of triangular meshes by Laplacian spectral analysis and a data set called a mesh pooling block (MPB) that is provided by dividing surface data into patches and aggregating the patches (Qiao, Y. L., Gao, L., Rosin, P., Lai, Y. K. and Chen, X., 2020. Learning on 3D Meshes with Laplacian Encoding and Pooling. IEEE Transactions on Visualization and Computer Graphics).

However, used programs of the library were, under the constraint that input shape data have diversity, ones having reduced problems with, for example, preparation of input data on the basis of the improved LaplacianNet by Sharp, et al., (Sharp, N. and Crane, K., 2020, August. A Laplacian for nonmanifold triangle meshes. In Computer Graphics Forum (Vol. 39, No. 5, pp. 69-80)). In the technical fields pertaining to the present invention, use or improvement of a program in a library falls within the category of common technical knowledge, so descriptions are given only regarding purposes of use and functions, and details are omitted.

For selection of a decoder, AtrasNet was used (Groueix, T., Fisher, M., Kim, V. G., Russell, B. C. and Aubry, M., 2018. A papier mache approach to learning 3d surface generation. In Proceedings of the IEEE conference on computer vision and pattern recognition (pp. 216-224)). This is because, unlike methods that deem a three-dimensional shape descriptor as an aggregation of surface element values of a three-dimensional shape so as to generate point cloud or voxel meshes, AtrasNet, which is a method for estimating a surface of a three-dimensional shape, can allows for decoding with high accuracy, low computer memory consumption, and arbitrary resolution.

Decoders in the libraries may be incapable of performing decoding into closed mesh shapes that do not intersect each other, so Neural Mesh Flow, which can perform decoding into closed mesh shapes that do not intersect each other, was also used (Gupta, K., 2020. Neural Mesh Flow: 3D Manifold Mesh Generation via Diffeomorphic Flows. University of California, San Diego). In particular, the program of AtrasNet inferred a surface shape, and the program of Neural Mesh Flow created spherical meshes from the result of inference and changed the spherical meshes in stages, thereby implementing decoding into closed mesh shapes not intersecting each other with high accuracy, low memory consumption, and arbitrary resolution.

In the verification using the verification data, encoding and decoding are performed using the verification data (step S4). When the error between a state before encoding and a state after decoding falls within an allowable range, training ends, and otherwise, the encoder, the decoder, and learning data are adjusted, and the training is repeated until it is evaluated that the error falls within the allowable range (steps S5, S6).

When using the method for fabricating a shape descriptor extractor without size information for the class separation described hereinafter, instead of reducing the error of the encoder by decoding, the encoder may be caused to learn a class name to which three-dimensional shape data pertaining to the three-dimensional shape descriptor belongs, so as to make adjustment for correct class separation, thereby reducing the error of the encoder.

Figure 4B:
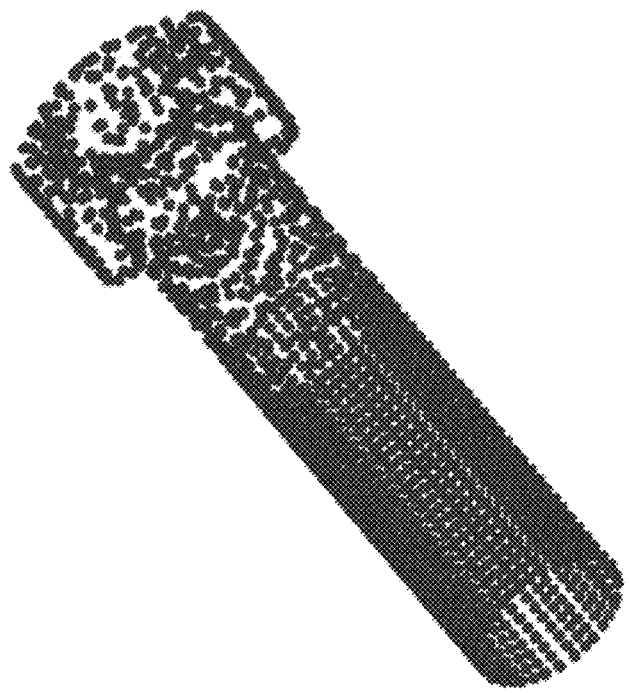
FIG. 4B is an image representing a three-dimensional shape of a point cloud.
Figure 4A:
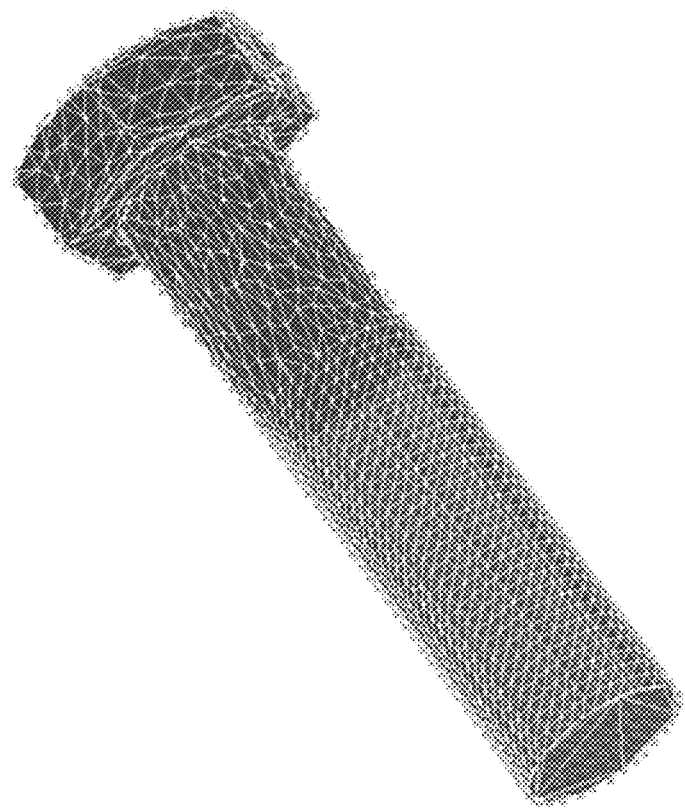
FIG. 4A is an image representing a three-dimensional shape of meshes.

FIG. 4A is an image representing a three-dimensional shape of meshes. FIG. 4B is an image representing a three-dimensional shape of a point cloud (described hereinafter). As seen in FIG. 4A, the surface of the three-dimensional shape is represented by an aggregation of adjacent triangular meshes. The triangular meshes forming the surface (more precisely, vertex coordinates and edge data of the triangular meshes) are provided for the training of the encoder and the decoder, so as to fabricate a three-dimensional shape descriptor extractor. The three-dimensional shape descriptor extractor fabricated through the flow described above extracts a three-dimensional shape descriptor pertaining to shape features and including no size information of a three-dimensional shape.

The following describes details of fabrication of a three-dimensional shape descriptor extractor from point cloud data.

The three-dimensional shape descriptor extractor fabricated from point cloud data extracts a three-dimensional shape descriptor including size information pertaining to a three-dimensional shape in addition to shape-associated features. The basic fabrication flow is similar to the one for the fabrication of a three-dimensional shape descriptor extractor from mesh data depicted in FIG. 1 (for the convenience of descriptions, the fabrication of a three-dimensional shape descriptor extractor from point cloud data is also based on FIG. 1).

First, three-dimensional shape data is acquired (step S1). In this case, the acquired three-dimensional shape data is similar to the one in the above-described data acquisition for mesh data.

Figure 5:
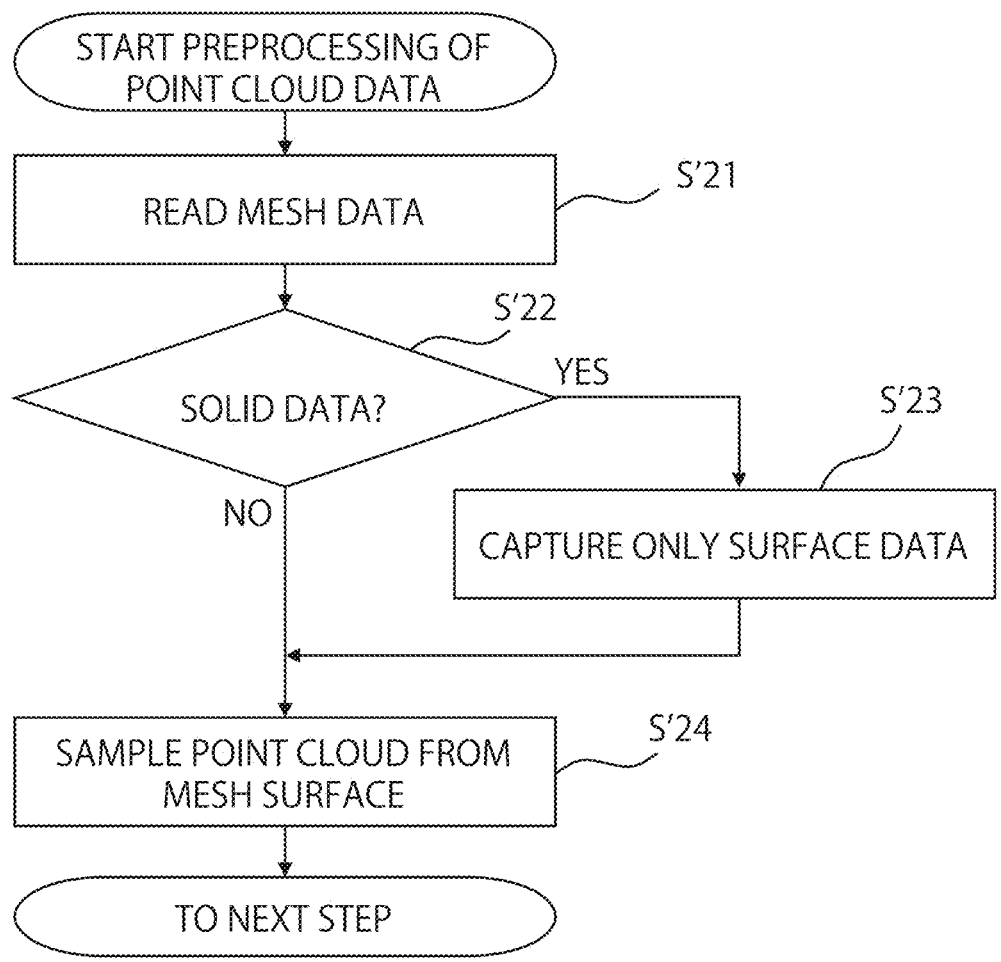
FIG. 5 illustrates a flow of preprocessing of point cloud data.

Next, preprocessing of the data for the training of the encoder and the decoder is performed (step S2). FIG. 5 illustrates a flow of preprocessing of point cloud data, indicating details of the preprocessing. First, the acquired data is read for preprocessing (step S'21).

Next, it is determined whether the read data is solid data (S'22). The present invention only requires surface data, so when information on the inside of a three-dimensional shape is included, only surface data is captured (step S'23).

Subsequently, to represent the surface of the three-dimensional shape, a point cloud is sampled from the surface of meshes captured as the surface data (step S'24). The sampling of the point cloud is performed according to surface angles formed by adjacent mesh faces. Specifically, the acuter the surface angle formed by adjacent mesh faces is, the more samples of the point cloud are collected.

Figure 6:
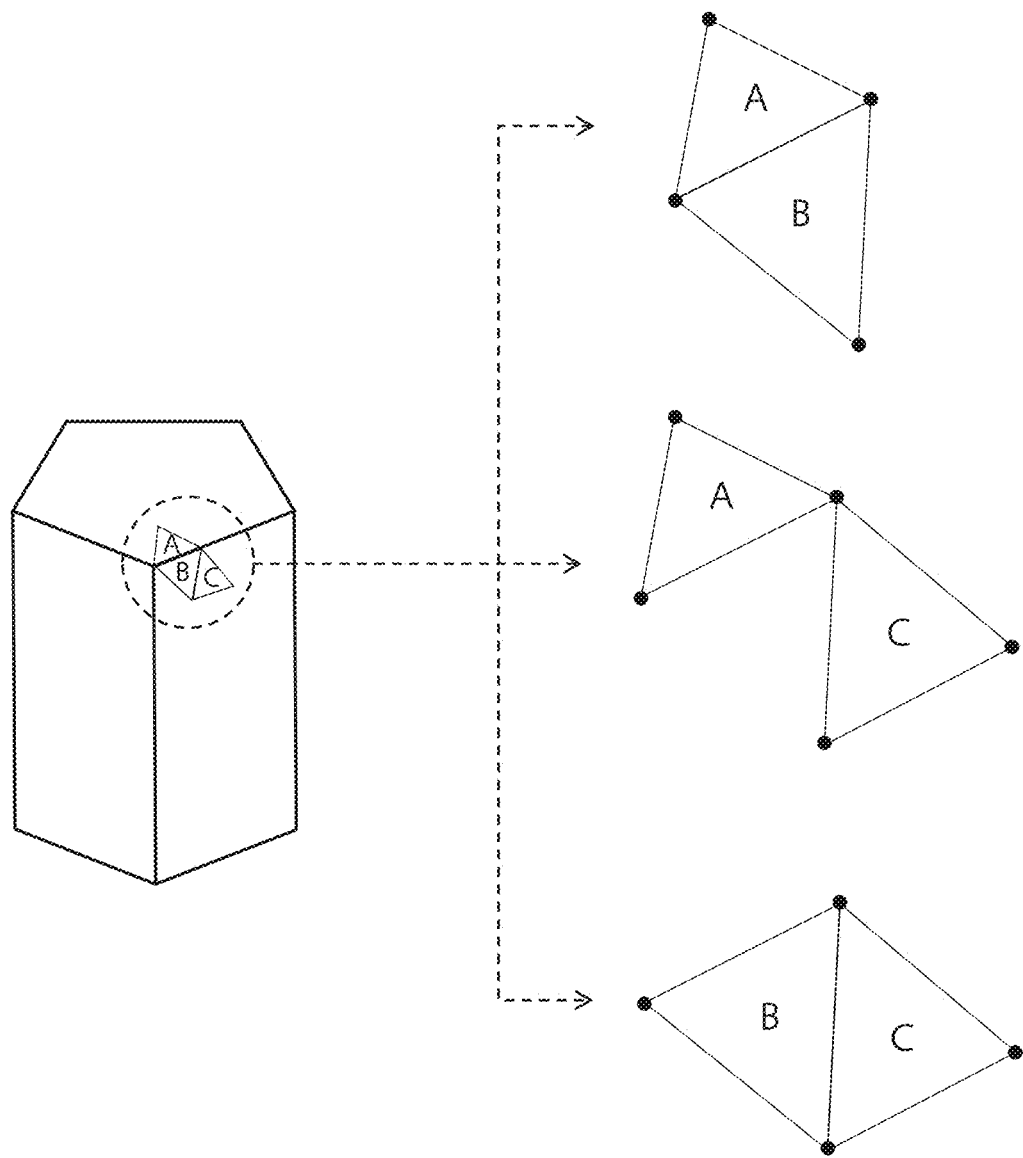
FIG. 6 is an image of adjacent meshes set on surfaces of a three-dimensional shape.

Now, descriptions are given of the surface angle between adjacent mesh faces. FIG. 6 is an image of adjacent meshes set on surfaces of a three-dimensional shape. FIG. 6 focuses on certain meshes (meshes A, B, C) among the meshes forming the surfaces of a pentagonal prism shape.

The mesh A forms a portion of the upper face of the pentagonal prism. The meshes B and C form portions of an identical side face of the pentagonal prism. The meshes A and B are adjacent at a verge portion between the upper face and the side face of the pentagonal prism, and the two faces form a right angle. The meshes A and C are adjacent at a point on the verge between the upper face and the side face of the pentagonal prism, and the two faces form a right angle. The meshes B and C are adjacent on the side face of the pentagonal prism, and the two faces are even with each other.

Figure 7:
FIG. 7 is an image of angles between adjacent mesh faces and point cloud sample counts.
Figure 7:
Figure 7:
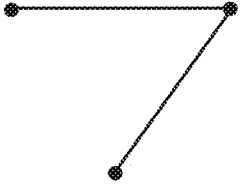

FIG. 7 is an image of angles between adjacent mesh faces and point cloud sample counts, with the relationships between pairs of meshes focused on. When meshes are adjacent on a flat face, the point cloud sample count is the lowest. The acuter the angle between adjacent mesh faces are, the higher the point cloud sample count is.

When focusing only on the relationships depicted in FIG. 6 between the meshes A and B and between the meshes B and C, the surface angle between the meshes A and B is acuter than the surface angle between the meshes B and C, so the point cloud sample count from the meshes A and B is high. Point cloud sample counts are higher for an acuter surface angle because a surface angle being acute allows for evaluation that a verge of a three-dimensional shape forms an acute angle, i.e., constitutes a shape-associated feature portion.

Although the above example is limited to the relationships between pairs of mesh faces, one mesh may actually be adjacent to a plurality of meshes. Thus, the relationships between the surface angles formed with individual adjacent mesh faces are totally reflected in a point cloud sample count. Even in the case of acute surface angles, for example, it is evaluated that meshes adjacent to each other at two points (one edge of each mesh) include a larger proportion of the region constituting a verge of a three-dimensional shape than meshes adjacent to each other at one point. Accordingly, the higher point cloud sample counts from mesh faces adjacent at two points is, the more appropriate training data for the grasping of the three-dimensional shape is provided.

Figure 8B:
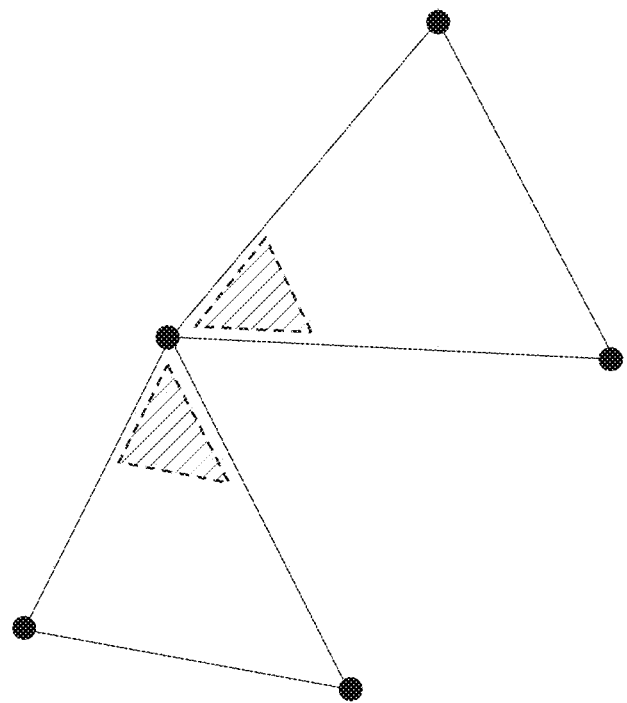
FIGS. 8A and 8B are images of sampled regions within meshes.
Figure 8A:
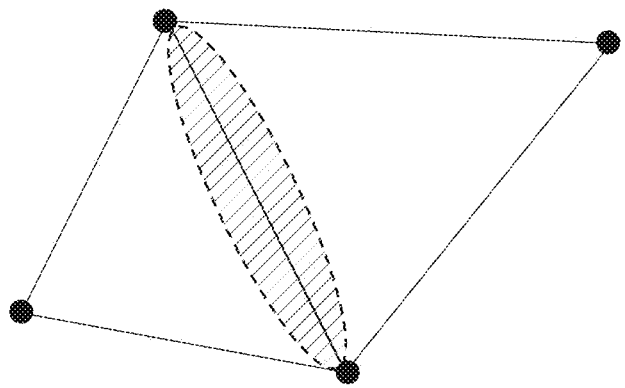

Adjusting sites of each single mesh face that are to be sampled allows for more appropriate sampling of a point cloud. FIGS. 8A and 8B are images of sampled regions within meshes. When triangular meshes form an acute surface angle with edges of thereof being adjacent, a region close to the adjacent portions may be a sampled region. When triangular meshes form an acute surface angle with vertexes thereof being adjacent, regions close to the adjacent vertex portions may be sampled regions.

Figure 9:
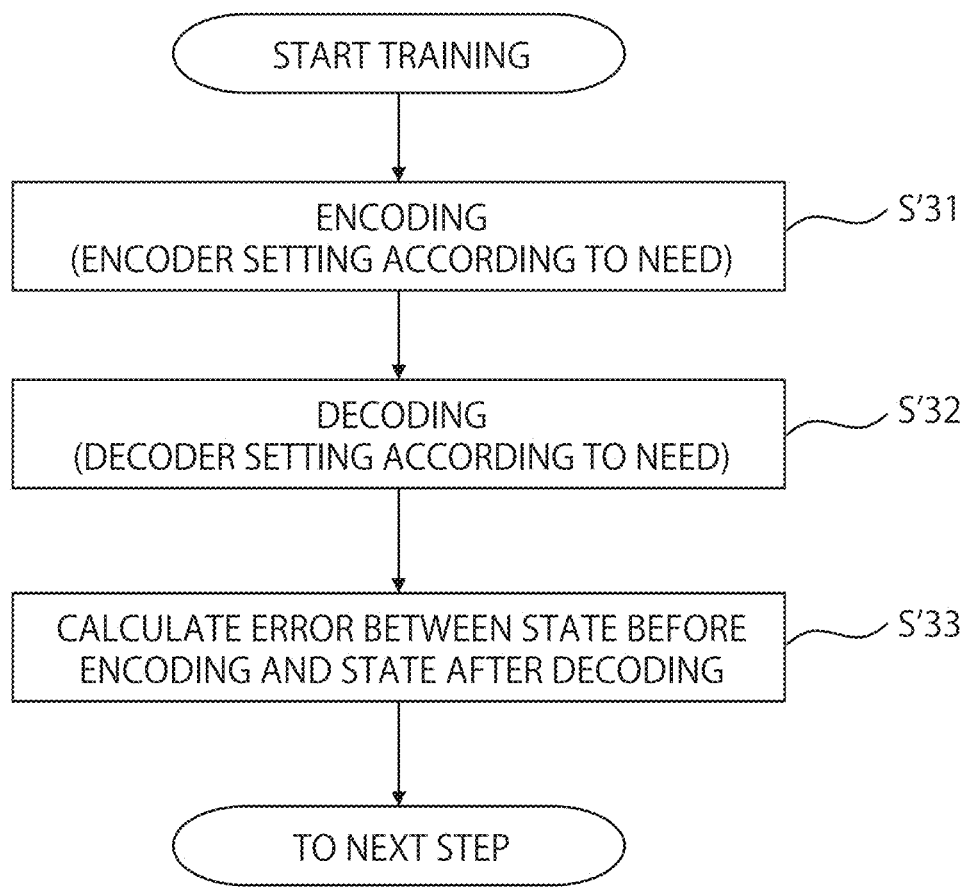
FIG. 9 illustrates a flow of training an encoder and a decoder with point cloud data.

The encoder and the decoder are trained with the point cloud data collected in such a manner (step S3). FIG. 9 illustrates a flow of training an encoder and a decoder with point cloud data.

The training includes: a step for encoding point cloud data as input data and extracting a three-dimensional shape descriptor as output data (S'31); a step for decoding the extracted three-dimensional shape descriptor (S'32); a step for calculating the error between the mesh data after the decoding and the mesh data before the encoding (S'33); and optionally, a step for adjusting the encoder and the decoder in order to enhance the reproducibility of the mesh data (S'31-S'33), i.e., the basic flow is the same as that of the training with mesh data.

As in the case of the training with mesh data, the encoder and the decoder are obtained from a publicly released library and then improved and tuned. In the present invention, any encoder and decoder can be used as long as the same can encode and decode point cloud data.

However, the encoder and the decoder are required to satisfy requirements similar to the requirements 1-8 pertaining to selection of an encoder and a decoder in training with mesh data (because decoding results pertain to mesh shapes). The encoder and the decoder were selected, further in view of the requirement that point cloud data be capable of being extracted from a three-dimensional shape.

In view of the above requirements, the present embodiment used PointNet for selection of an encoder (Qi, C. R., Su, h., Mo, K. and Guibas, L. J., 2017. Pointnet: Deep learning on point sets for 3d classification and segmentation. In Proceedings of the IEEE conference on computer vision and pattern recognition (pp. 652-660)). Programs of the library can directly encode point cloud data. AtrasNet and Neural Mesh Flow were used for selection of a decoder.

The processing is similar to that in the above-described case of mesh data, in terms of the verification using verification data after training the encoder and the decoder with point cloud data (step S4), the evaluation of an error with verification data (step S5), and the changes in the training method and settings upon the error not falling within an allowable range (step S6).

Descriptions have been given of the method for fabricating a three-dimensional shape descriptor extractor by using mesh data and the method for fabricating a three-dimensional shape descriptor extractor by using point cloud data. The three-dimensional shape descriptor extractor from mesh data extracts a three-dimensional shape descriptor including no size information from three-dimensional shape data. Meanwhile, the three-dimensional shape descriptor extractor from point cloud data sampled from mesh data extracts a three-dimensional shape descriptor including size information.

When dimension information is unnecessary to grasp a three-dimensional shape, the three-dimensional shape can be rapidly grasped with a little information by extracting a three-dimensional shape descriptor including no size information. When grasping a three-dimensional shape, including a dimension of the three-dimensional shape, the three-dimensional shape can be grasped more elaborately by extracting a three-dimensional shape descriptor including size information.

Actually, for 180 types of bolts of seven categories, shape category prediction and shape similarity comparison were performed. Through the extraction of three-dimensional shape descriptors including no size information, it was confirmed that, as in the conventional categorizing, the bolts can be classified into seven categories; and through the extraction of three-dimensional shape descriptors including size information, it was confirmed that the similarity between identical bolts is the highest by comparing the similarities between the 180 types of bolts. For 30 types of brackets, in addition, the similarities between the 30 types of brackets were compared through the extraction of three-dimensional shape descriptors including size information, and it was confirmed that the similarity between identical brackets is the highest (details pertaining to the category prediction and similarity comparison are described hereinafter with reference to the second embodiment).

Second Embodiment

The following describes, with reference to a second embodiment, a method for retrieving a three-dimensional shape and a three-dimensional shape retrieval system based on the three-dimensional shape descriptor extractor fabricated in accordance with the first embodiment.

Figure 10:
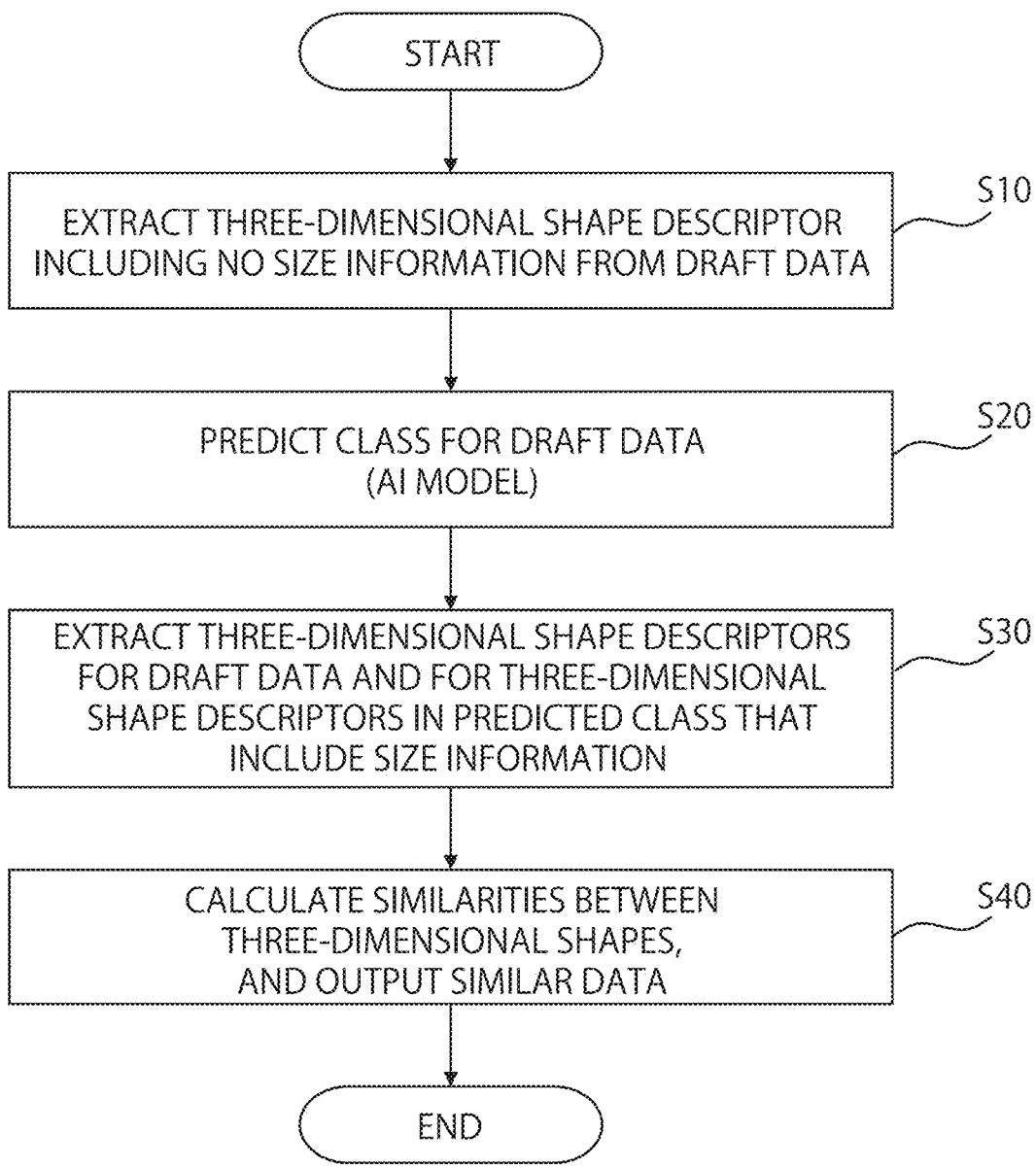
FIG. 10 illustrates the flow of a three-dimensional shape retrieval method.

FIG. 10 illustrates the flow of a three-dimensional shape retrieval method. This method allows a desired three-dimensional shape to be retrieved from existing three-dimensional shape data. Specifically, a desired three-dimensional shape is defined as draft data (e.g., 3DCAD diagram, 3D diagram provided by scanning with a 3D scanner), and a shape similar to the three-dimensional shape pertaining to the draft data is retrieved from a library storing existing three-dimensional shape data similar to the draft data.

A roughly represented flow of the three-dimensional shape retrieval method includes: a step for creating draft data (omitted in FIG. 1); a step for extracting a three-dimensional shape descriptor including no size information from the three-dimensional shape data of the draft data (S10); a step for predicting, by learning-finished AI on the basis of the extracted three-dimensional shape descriptor, which class in a library of existing three-dimensional shape data the draft data corresponds to (S20); a step for extracting three-dimensional shape descriptors including size information from three-dimensional shape data belonging to the class predicted by the learning-finished AI (S30); and a step for calculating, on the basis of the extracted three-dimensional shape descriptors, the similarities between the three-dimensional shape of the draft data and the three-dimensional shape data belonging to the class predicted by the learning-finished AI, and outputting three-dimensional shape data similar to the three-dimensional shape of the draft data (S40).

Details of each step are described in the following.

First, draft data is prepared. For example, when there is a prototype, the prototype is read by a 3D scanner, and surface data pertaining to a three-dimensional shape is created as draft data.

Next, a three-dimensional shape descriptor extractor fabricated from mesh data extracts a three-dimensional shape descriptor for the draft data (step S10). The three-dimensional shape descriptor does not include size information.

Subsequently, an AI model predicts which three-dimensional shape class among existing three-dimensional shape data the three-dimensional shape of the draft data belongs to (step S20). Note that the AI model is generated by learning three-dimensional shape descriptors extracted from exiting data by a three-dimensional shape descriptor extractor fabricated by the above-described training based on mesh data and the class names of classes to which three-dimensional shape data pertaining to the three-dimensional shape descriptor belongs.

Figure 11:
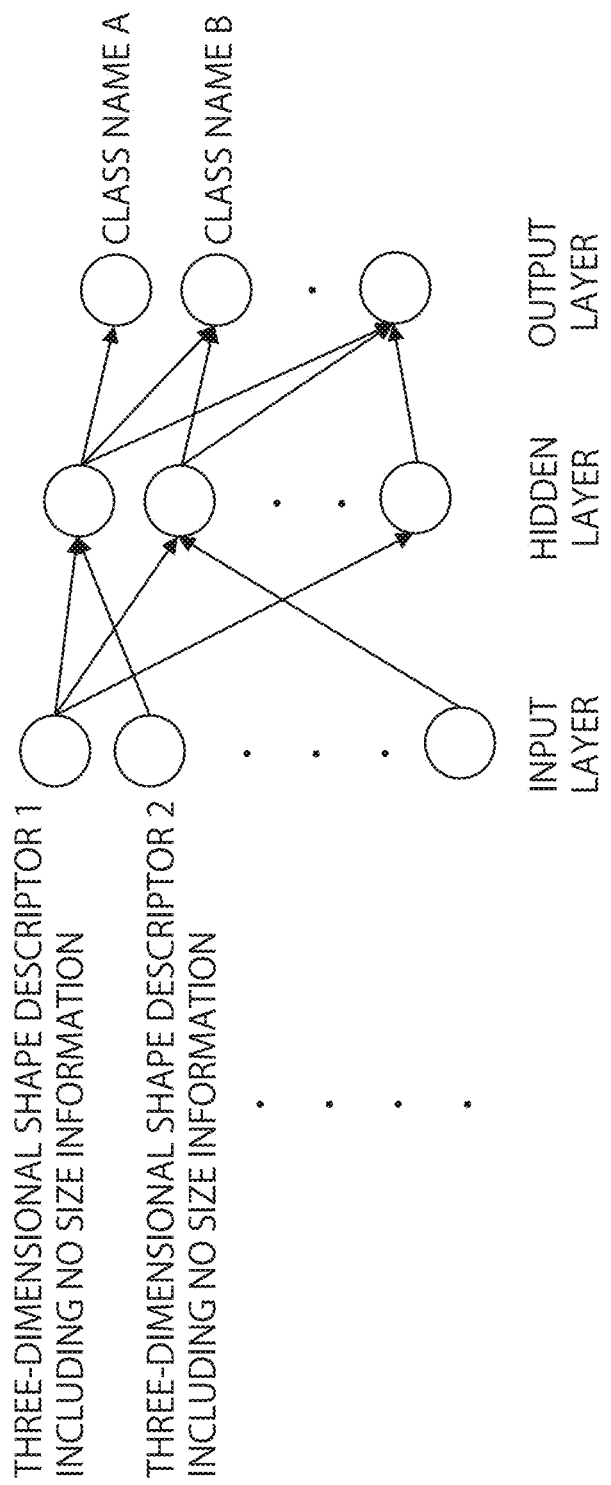
FIG. 11 is an image of a relationship between input information and output information pertaining to generation of a learning model.

FIG. 11 is an image of a relationship between input information and output information pertaining to generation of a learning model. The input information is three-dimensional shape descriptors including no size information. The output information is class names (names assigned to shape types by, for example, the owner of three-dimensional shape data). Thus, the learning model for predicting the class of a three-dimensional shape is generated in advance by learning, with class names and three-dimensional shape descriptors including no size information being used as learning data pairs.

Figure 12:
FIG. 12 is an image of three-dimensional shape data for individual classes.

FIG. 12 is an image of a library of existing three-dimensional shape data for individual classes. In FIG. 12, bolt parts are classified into classes according to head shapes (group names in the figure correspond to classes). Each piece of three-dimensional shape data is tagged with a class name.

Figure 13:
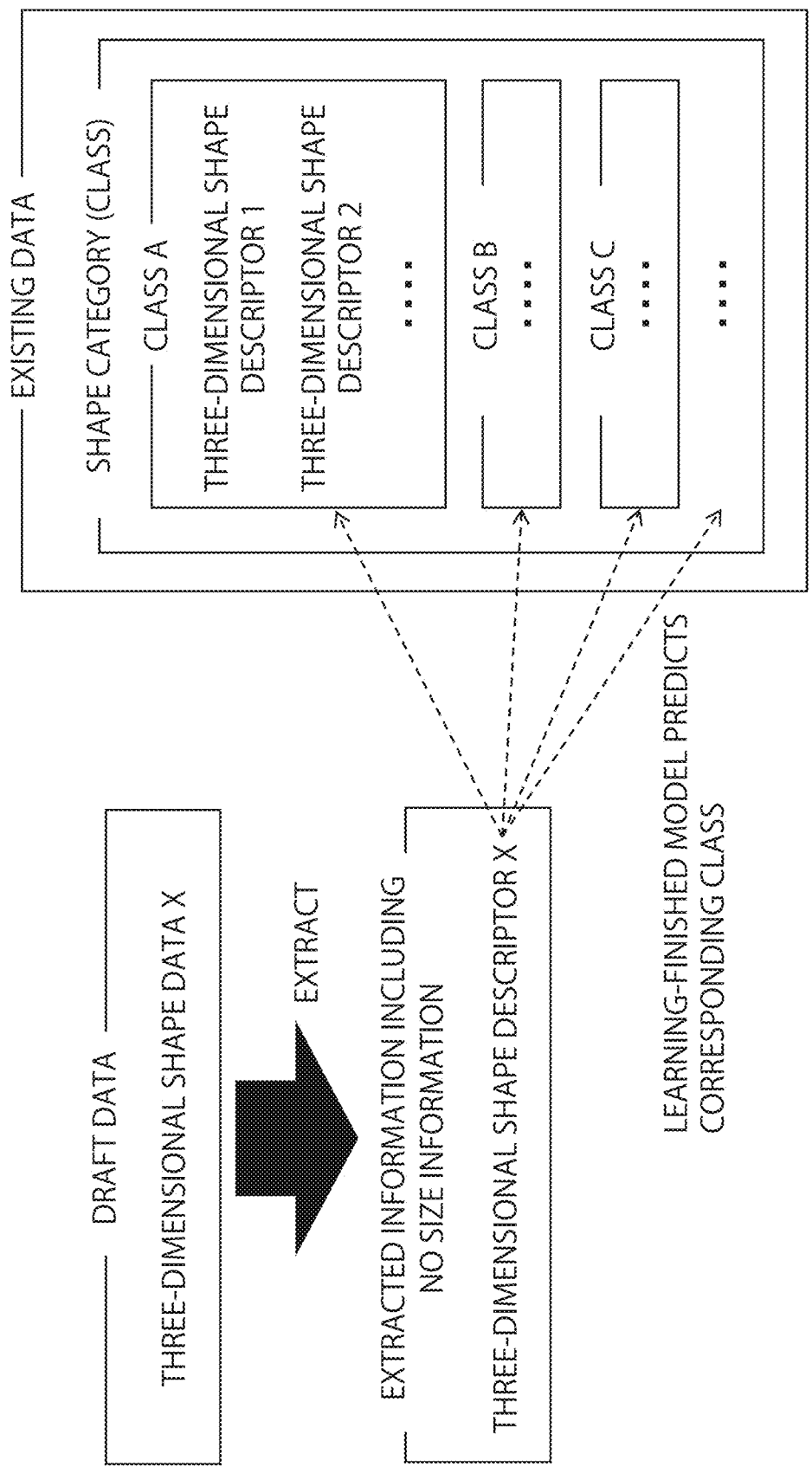
FIG. 13 is a conceptual diagram of steps S10 and S20 in FIG. 10.

FIG. 13 is a conceptual diagram of steps S10 and S20 in FIG. 10. First, a three-dimensional shape descriptor extractor fabricated from mesh data extracts a three-dimensional shape descriptor including no size information from draft data. Then, with the extracted three-dimensional shape descriptor including no size information as input data, the learning-finished model outputs information indicating which class of existing data a three-dimensional shape pertaining to the draft data corresponds to (predicts a class).

In this situation, only the class prediction is performed, and all the data in the predicted class may be output as similar data, or similarities may be calculated on the basis of the three-dimensional shape descriptor including no size information, so as to output similar data.

Next, a three-dimensional shape descriptor extractor fabricated from point cloud data extracts three-dimensional shape descriptors for the draft data and for the three-dimensional shape data in the predicted class (step S30). The three-dimensional shape descriptors include size information.

Figure 14:
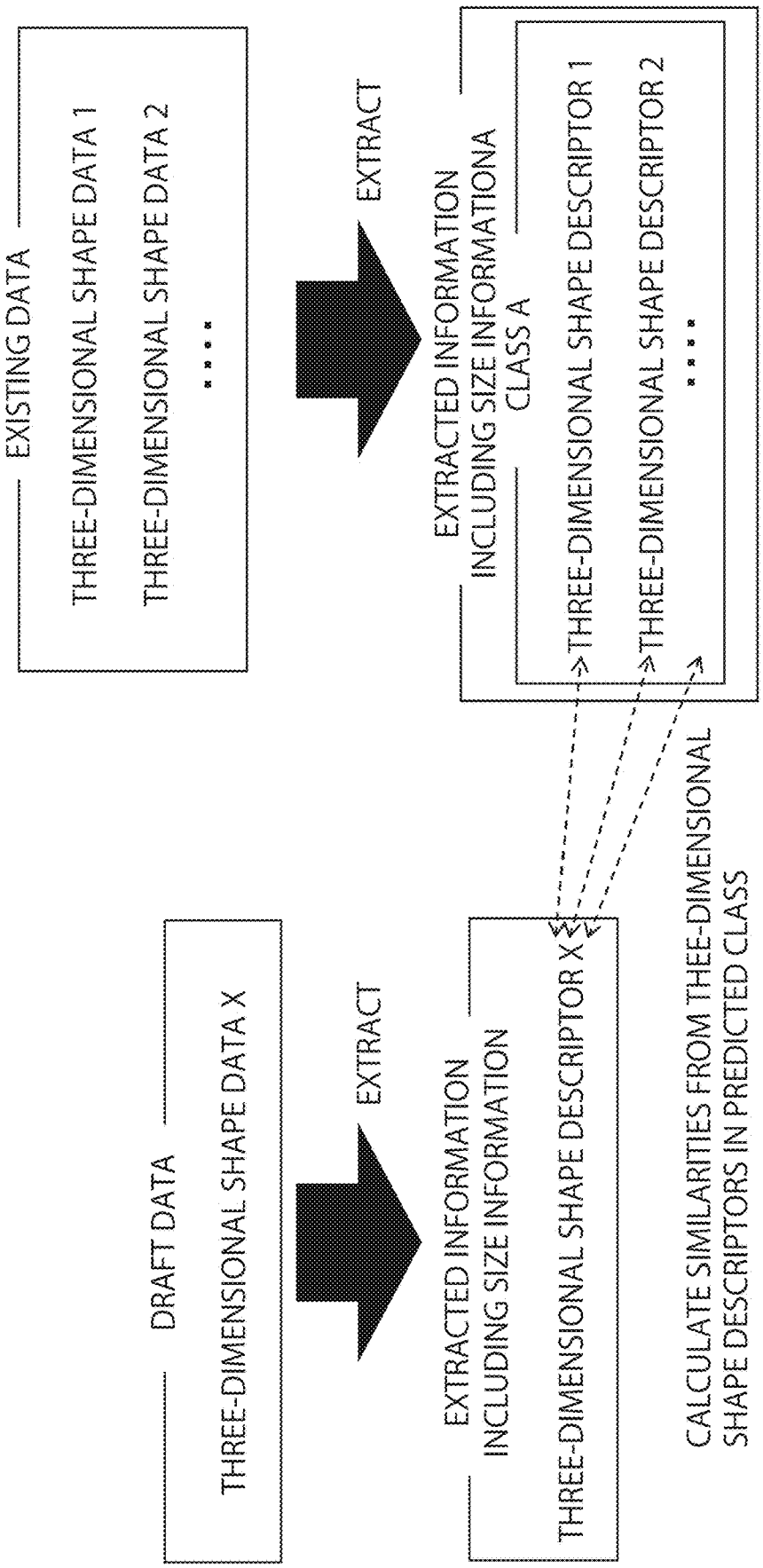
FIG. 14 is a conceptual diagram of steps S30 and S40 in FIG. 10.

Subsequently, the similarities between the three-dimensional shape descriptor extracted from the draft data and the three-dimensional shape descriptors extracted from the three-dimensional shape data in the predicted class are calculated, and data determined to be similar to the three-dimensional shape descriptor extracted from the draft data is output (step S40). The similarities are calculated on the basis of the distances (errors) between the three-dimensional shape descriptors extracted from the draft data and the three-dimensional shape descriptors (N-dimensional data) extracted from the three-dimensional shape data in the class. The distances are each the square root of the sum of values that are each the square of the difference in an identical dimension of the N-dimensional data (square root of $((X_1-Y_1)^2+(X_2-Y_2)^2+\ldots+(X_n-Y_n)^2)$. A three-dimensional shape descriptor with the shortest distance is determined to be similar, and three-dimensional shape data pertaining to this three-dimensional shape descriptor is output. FIG. 14 is a conceptual diagram of steps S30 and S40 in FIG. 10. The determination for the similarities between three-dimensional shapes may be performed within any range, without being limited to a predicted class.

Figure 15:
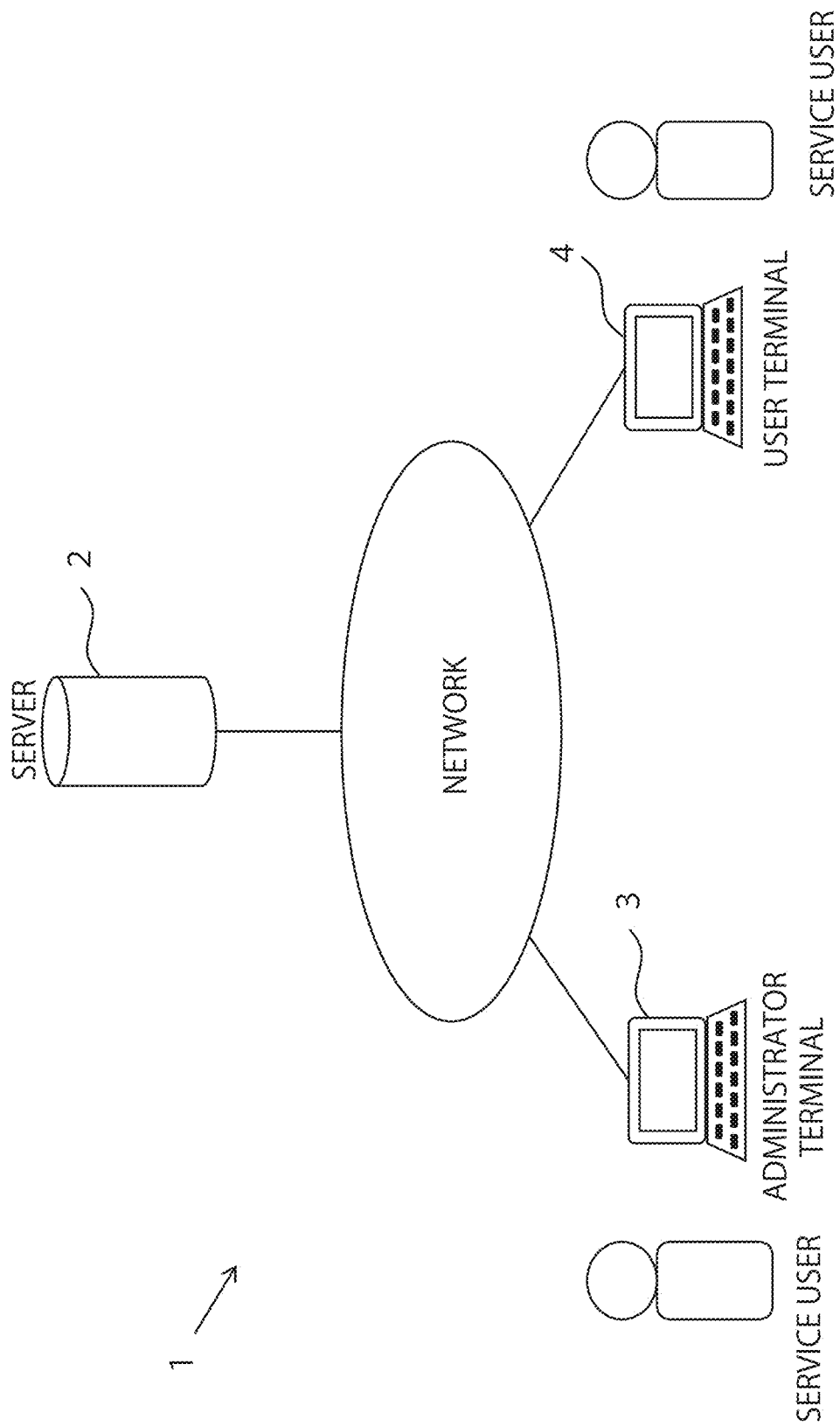
FIG. 15 illustrates an example of a three-dimensional shape retrieval system.

The above method for retrieving a three-dimensional shape allows a request from a third party (need for retrieval of a three-dimensional shape) to be accommodated. FIG. 15 illustrates an example of a three-dimensional shape retrieval system 1. This example represents a relationship attained over a network between a server 2 for implementing three-dimensional shape retrieval, a service provider (administrator terminal 2), and a service user (user terminal 3).

The service provider creates an environment such that the administrator terminal 3 or the user terminal 4 of the service user can use functions of the server 2 pertaining to three-dimensional retrieval so as to implement retrieval of three-dimensional shapes. However, FIG. 15 depicts nothing but one form of the system, and the number of players associated with the three-dimensional shape system 1, terminals, programs, the owning of data, other system configurations, and the like are not limited, as long as these are based on the method for retrieving a three-dimensional shape in accordance with the present invention. Meanwhile, the present invention should not be construed according to the name of, for example, an apparatus, and should be flexibly construed from components of the invention.

The server 2 may include a control unit and a storage unit (not illustrated); the control unit may include, for example, an acquisition unit for acquiring various data, an extraction unit for extracting a three-dimensional shape descriptor including no size information or three-dimensional shape descriptors including size information from three-dimensional shape data, a prediction unit for predicting a class for a three-dimensional shape on the basis of the three-dimensional shape descriptor including no size information, and an inference unit for inferring the levels of three-dimensional shape similarity by using the three-dimensional shape descriptors including size information (not illustrated); and the storage unit may include, for example, a learning-finished model (model similar to the learning-finished model described above) pertaining to three-dimensional shape data and the relationships between class names and three-dimensional shape descriptors including no size information (not illustrated). A system including a learning unit for generating a learning-finished AI model by performing learning, with three-dimensional shape descriptors including no size information and the class names thereof as teacher data, also falls within the category of the system in accordance the present invention. A three-dimensional shape descriptor including no size information that is obtained from draft data is also used as learning data so as to enhance and update the learning-finished model.

The following example is described regarding a case in which a service user wishes to find desired three-dimensional shape data among existing three-dimensional shape data.

First, the service user creates draft data so as to acquire desired data. The desired data is similar to the three-dimensional shape of the draft data. The service user inputs the draft data to the user terminal 4. Then, the acquisition unit of the server 2 acquires the draft data from the user terminal 4. Next, the extraction unit extracts a three-dimensional shape descriptor that does not include size information of the draft data. Subsequently, the prediction unit refers to a learning-finished model and predicts a class for the three-dimensional shape of the draft data (class among existing three-dimensional shape data) on the basis of the extracted three-dimensional shape descriptor including no size information. Afterward, the extraction unit extracts a three-dimensional shape descriptor for the draft data and three-dimensional shape descriptors including the size information of the three-dimensional shape data in the predicted class. Next, on the basis of the extracted three-dimensional shape descriptors including size information, the inference unit retrieves a three-dimensional shape similar to the three-dimensional shape of the draft data. The user terminal 4 acquires the result of retrieval and other necessary information. The service provider uses, according to need, the administrator terminal 3 so as to, for example, monitor or support the operations or implement retrieval as proxy. The service user may also choose to determine similarities with all the three-dimensional shape data in the library, without predicting a class.

Third Embodiment

In view of the first and second embodiments, the following describes considerations pertaining to the present invention with reference to a third embodiment.

In the first embodiment, with mesh data and point cloud data as learning data, a publicly released set of an available encoder and decoder is trained and verified to fabricate a three-dimensional shape descriptor extractor. Although the present invention uses the libraries described above, the encoder and the decoder are not limited. In consideration of the requirements described above, the encoder and the decoder need to undergo, for example, evaluation, selection, and tuning by repetitive training.

In the present invention, the three-dimensional shape descriptor extractor that uses mesh data as learning data extracts a three-dimensional shape descriptor including no size information. Thus, a three-dimensional shape descriptor simply and accurately representing the features of a three-dimensional shape with a reduced data volume can be extracted.

In the present invention, the three-dimensional shape descriptor extractor that uses point cloud data as learning data extracts a three-dimensional shape descriptor including size information. Conventionally, it has been difficult to extract a three-dimensional shape descriptor including size information by using a method that uses mesh data or a method that randomly samples point cloud from a three-dimensional surface. However, a three-dimensional shape descriptor including size information can be extracted by using information from mesh data (adjacent meshes forming the surface of a three-dimensional shape), which is described above.

Furthermore, a three-dimensional shape can be retrieved efficiently owing to the ability to extract both a three-dimensional shape descriptor including no size information and a three-dimensional shape descriptor including size information. In particular, in the presence of a large amount of three-dimensional shape data, a three-dimensional shape descriptor including no size information is used for classification according to shape, and a three-dimensional shape descriptor including size information is used for retrieval of a three-dimensional shape in a class, thereby allowing for retrieval with a small amount of data processing.

However, three-dimensional shape descriptors including size information may be extracted from classes other than a prescribed class. For example, at a request from the user, three-dimensional shape descriptors may be extracted from a desired class or may be extract from all the classes.

The present invention uses mesh data as surface data of a three-dimensional shape and thus can exhibit the effect of training an encoder and a decoder as learning data simply and accurately representing the three-dimensional shape, so as to fabricate a three-dimensional shape descriptor extractor. In the present invention, for meshes capable of being encoded and decoded by the training, more point cloud data is collected as surface data for adjacent mesh faces forming a larger surface angle, so as to allow for accurate training of the encoder and the decoder, thereby exhibiting the effect of fabricating a highly accurate three-dimensional shape descriptor extractor. The present invention can also exhibit the effect of extracting highly accurate three-dimensional shape descriptors by using a three-dimensional shape descriptor extractor including no size data as a result of training with mesh data and a three-dimensional shape descriptor extractor including size information as a result of training with point cloud data, and the three-dimensional shape descriptors can be used for, for example, searching in the field of AI.

The present invention can be used in fields pertaining to retrieval of a three-dimensional shape. For example, in the case of, for example, the designing section of a maker creating new design drawings based on design drawings for shapes similar to desired shapes, the present invention can be used as a simple, rapid, and highly accurate method and system for retrieving design drawings from a multitude of existing design drawings. Furthermore, a presentable example of using the present invention may be providing, for example, a company owning a low number of design drawings with effectively usable design drawings from libraries of design drawings.

Although the present modes are explained above based on the embodiments and modifications, the embodiments in the above-described modes are for facilitating the understanding of the present modes and do not limit the present modes. The present modes can be changed or modified without departing from the spirit and scope of the claims, and the present modes include their equivalents. Some technical features may be eliminated as appropriate unless the present specification describes the technical features as essential.

In addition to the above-described embodiments, the following appendants are added.

(Appendant 1) A method for fabricating a three-dimensional shape descriptor extractor, the three-dimensional shape descriptor extractor being implemented by collecting surface data from a three-dimensional shape as learning data and training a set of a prescribed encoder and a prescribed decoder by using the learning data, wherein
  the training extracts (encodes) a three-dimensional shape descriptor from the learning data by using the encoder, undoes (decodes) the three-dimensional shape descriptor by using the decoder, evaluates a difference (error) between a state before the encoding and a state after the decoding, and adjusts the encoder and the decoder so as to reduce the error, and
  the method comprises collecting mesh data from the three-dimensional shape as the surface data and making the mesh data have a prescribed scale, so as to train the encoder and the decoder.

(Appendant 2) A method for fabricating a three-dimensional shape descriptor extractor, the three-dimensional shape descriptor extractor being implemented by collecting surface data from a three-dimensional shape as learning data and training a set of a prescribed encoder and a prescribed decoder by using the learning data, wherein
  the training extracts (encodes) a three-dimensional shape descriptor from the learning data by using the encoder, undoes (decodes) the three-dimensional shape descriptor by using the decoder, evaluates a difference (error) between a state before the encoding and a state after the decoding, and adjusts the encoder and the decoder so as to reduce the error, and
  the method comprises, for meshes capable of being encoded and decoded by a three-dimensional shape descriptor extractor fabricated using the fabrication method of appendant 1, collecting, as the surface data, more point group data for adjacent mesh faces forming an acuter surface angle, so as to train the encoder and the decoder.

(Appendant 3) A three-dimensional shape retrieval method for retrieving a three-dimensional shape similar to a three-dimensional shape of draft data from existing three-dimensional shape data, the three-dimensional shape retrieval method comprising:
  first, predicting, among the existing three-dimensional shape data, a shape type (class) that the draft data corresponds to, wherein
  the predicting a class that the draft data corresponds to is performed by an AI model on the basis of a three-dimensional shape descriptor extracted from the draft data by a three-dimensional shape descriptor extractor fabricated using the fabrication method of appendant 1, and
  the AI model is a learning-finished model that has learned and generated, as a learning data pair, a three-dimensional shape descriptor extracted from the existing three-dimensional shape data by the three-dimensional shape descriptor extractor fabricated using the fabrication method of appendant 1 and a class name of a class to which three-dimensional shape data pertaining to the three-dimensional shape descriptor belongs, and that has learned, in advance, a relationship between the three-dimensional shape descriptor and the class name,
  the method further comprising:
  subsequently, retrieving, from three-dimensional shape data belonging to the predicted class, three-dimensional shape data having a three-dimensional shape similar to the three-dimensional shape of the draft data, wherein
  the retrieving extracts, by using a three-dimensional shape descriptor extractor fabricated using the fabrication method of appendant 2, three-dimensional shape descriptors for the draft data and for the three-dimensional shape data belonging to the class, compares the three-dimensional shape descriptors, and determines that three-dimensional shape data pertaining to a three-dimensional shape descriptor having a shortest distance to the three-dimensional shape descriptor for the draft data is similar to the draft data.

(Appendant 4) A three-dimensional shape retrieval system comprising:
  an acquisition unit configured to acquire draft data;
  a storage unit configured to store existing three-dimensional shape data;
  an extraction unit configured to extract a three-dimensional shape descriptor by using a three-dimensional shape descriptor extractor fabricated using the fabrication method of appendant 1 and a three-dimensional shape descriptor extractor fabricated using the fabrication method of appendant 2;
  a prediction unit configured to predict, among the existing three-dimensional shape data, a shape type (class) that the draft data acquired by the acquisition unit corresponds to; and
  an inference unit configured to retrieve, among desired three-dimensional shape data, three-dimensional shape data similar to draft data acquired by the acquisition unit that pertains to a three-dimensional shape descriptor, and output the retrieved three-dimensional shape data, wherein
  the predicting a class that the draft data corresponds to is performed by an AI model on the basis of a three-dimensional shape descriptor extracted from the draft data by the three-dimensional shape descriptor extractor fabricated using the fabrication method of appendant 1, the AI model is a learning-finished model that has learned and generated, as a learning data pair, a three-dimensional shape descriptor extracted from the existing three-dimensional shape data by the three-dimensional shape descriptor extractor fabricated using the fabrication method of appendant 1 and a class name of a class to which three-dimensional shape data pertaining to the three-dimensional shape descriptor belongs, and that has learned, in advance, a relationship between the three-dimensional shape descriptor and the class name, and the retrieving extracts, by using the three-dimensional shape descriptor extractor fabricated using the fabrication method of appendant 2, three-dimensional shape descriptors for the draft data and for the three-dimensional shape data belonging to the class, compares the three-dimensional shape descriptors, and determines that three-dimensional shape data pertaining to a three-dimensional shape descriptor having a shortest distance to the three-dimensional shape descriptor for the draft data is similar to the draft data.

What is claimed is:

1. A method for fabricating a three-dimensional shape descriptor extractor, the method comprising:
   collecting surface data from a three-dimensional shape as learning data; and
   training a set of a prescribed encoder and a prescribed decoder by using the learning data, the training extracting a three-dimensional shape descriptor from the learning data by using the encoder, undoes the three-dimensional shape descriptor by using the decoder, evaluates a difference between a state before using the encoding and a state after using the decoding, and adjusts the encoder and the decoder so as to reduce the error, wherein
   the collecting collects, as the surface data, more point cloud data for adjacent mesh faces forming an acuter surface angle for meshes capable of being encoded and decoded by the three-dimensional shape descriptor extractor,
   the training trains the encoder and the decoder using the surface data.

2. A three-dimensional shape retrieval method with a first three-dimensional shape descriptor extractor and a second three-dimensional shape descriptor extractor fabricated using the method of claim 1, the three-dimensional shape retrieval method comprising:
   predicting, among existing three-dimensional shape data, a class of a shape type that draft data corresponds to; and
   retrieving, from three-dimensional shape data belonging to a predicted class, three-dimensional shape data having a three-dimensional shape similar to the three-dimensional shape of the draft data, wherein
   the predicting the class that the draft data corresponds to is performed by an AI model on the basis of a first three-dimensional shape descriptor extracted from the draft data by the first three-dimensional shape descriptor extractor,
   the AI model is a learning-finished model that has learned and generated, as a learning data pair, a second three-dimensional shape descriptor extracted from the existing three-dimensional shape data by the first three-dimensional shape descriptor extractor and a class name of a class to which three-dimensional shape data pertaining to the second three-dimensional shape descriptor belongs, and that has learned, in advance, a relationship between the second three-dimensional shape descriptor and the class name, the retrieving extracts, by using the second three-dimensional shape descriptor extractor, a third three-dimensional shape descriptor for the draft data and a fourth three-dimensional shape descriptor for the three-dimensional shape data belonging to the class, compares the third three-dimensional shape descriptor with the fourth three-dimensional shape descriptor, and determines that three-dimensional shape data pertaining to the fourth three-dimensional shape descriptor having a shortest distance to the third three-dimensional shape descriptor is similar to the draft data, and the first three-dimensional shape descriptor extractor is fabricated by a method comprising:
collecting surface data from a three-dimensional shape as learning data; and
training a set of a prescribed encoder and a prescribed decoder by using the learning data as the three-dimensional shape descriptor extractor, the training extracting a three-dimensional shape descriptor from the learning data by using the encoder, undoes the three-dimensional shape descriptor by using the decoder, evaluates a difference between a state before using the encoding and a state after using the decoding, and adjusts the encoder and the decoder so as to reduce the difference, wherein
the collecting collects mesh data from the three-dimensional shape as the surface data and making the mesh data have a prescribed scale, and
the training trains the encoder and the decoder using the surface data.

3. A three-dimensional shape retrieval system with a first three-dimensional shape descriptor extractor and a second three-dimensional shape descriptor extractor fabricated using the method of claim 1, the three-dimensional shape retrieval system comprising:
   an acquisition unit configured to acquire draft data that pertains to a three-dimensional shape descriptor;
   a storage unit configured to store existing three-dimensional shape data;
   an extraction unit configured to extract three-dimensional shape descriptors by using the first three-dimensional shape descriptor extractor and the second three-dimensional shape descriptor extractor;
   a prediction unit configured to predict, among the existing three-dimensional shape data, a class of a shape type that the draft data acquired by the acquisition unit corresponds to; and
   an retrieval unit configured to retrieve, among desired three-dimensional shape data, three-dimensional shape data similar to the three-dimensional shape of the draft data, and
   an output unit configured to output retrieved three-dimensional shape data, wherein
   the prediction unit performs a prediction by an AI model on the basis of a first three-dimensional shape descriptor extracted from the draft data by the first three-dimensional shape descriptor extractor,
   the AI model is a learning-finished model that has learned and generated, as a learning data pair, a second three-dimensional shape descriptor extracted from the existing three-dimensional shape data by the first three-dimensional shape descriptor extractor and a class name of a class to which three-dimensional shape data pertaining to the second three-dimensional shape descriptor belongs, and that has learned, in advance, a relationship between the second three-dimensional shape descriptor and the class name, and the retrieval unit extracts, by using the second three-dimensional shape descriptor extractor, a third three-dimensional shape descriptor for the draft data and a fourth three-dimensional shape descriptor for the three-dimensional shape data belonging to the class, compares the third three-dimensional shape descriptor with the fourth three-dimensional shape descriptor, and determines that three-dimensional shape data pertaining to the fourth three-dimensional shape descriptor having a shortest distance to the third three-dimensional shape descriptor is similar to the draft data, and the first three-dimensional shape descriptor extractor is fabricated by a method comprising:

collecting surface data from a three-dimensional shape as learning data; and training a set of a prescribed encoder and a prescribed decoder by using the learning data as the three-dimensional shape descriptor extractor, the training extracting a three-dimensional shape descriptor from the learning data by using the encoder, undoes the three-dimensional shape descriptor by using the decoder, evaluates a difference between a state before using the encoding and a state after using the decoding, and adjusts the encoder and the decoder so as to reduce the difference, wherein the collecting collects mesh data from the three-dimensional shape as the surface data and making the mesh data have a prescribed scale, and the training trains the encoder and the decoder using the surface data.

* * * * *